US008977767B2

(12) United States Patent
Canoy et al.

(10) Patent No.: US 8,977,767 B2
(45) Date of Patent: Mar. 10, 2015

(54) METHODS AND APPARATUSES FOR AFFECTING PROGRAMMING OF CONTENT FOR TRANSMISSION OVER A MULTICAST NETWORK

(75) Inventors: Michael-David N. Canoy, San Diego, CA (US); Paul E. Bender, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/908,651

(22) Filed: Oct. 20, 2010

(65) Prior Publication Data

US 2012/0102120 A1    Apr. 26, 2012

(51) Int. Cl.
| | |
|---|---|
| *G06F 15/16* | (2006.01) |
| *H04N 21/414* | (2011.01) |
| *H04H 60/33* | (2008.01) |
| *H04N 21/25* | (2011.01) |
| *H04N 21/2668* | (2011.01) |
| *H04N 21/6405* | (2011.01) |
| *H04H 60/48* | (2008.01) |
| *H04H 60/66* | (2008.01) |

(52) U.S. Cl.
CPC ......... *H04N 21/41407* (2013.01); *H04H 60/33* (2013.01); *H04H 60/48* (2013.01); *H04H 60/66* (2013.01); *H04N 21/252* (2013.01); *H04N 21/2668* (2013.01); *H04N 21/6405* (2013.01)
USPC .......................................... 709/231; 455/466

(58) Field of Classification Search
CPC .......... H04W 4/12–4/14; H04H 60/33; H04N 21/00; H04N 21/20–21/278; H04L 51/00–51/38; H04L 63/30–63/308; H04L 12/18–12/1895; H04L 65/4076–65/4084; H04L 65/605

USPC ................ 725/9–21, 24, 32–36, 62, 86–104; 709/230–231, 206; 370/312; 455/466
See application file for complete search history.

(56) References Cited

U.S. PATENT DOCUMENTS

| | | | |
|---|---|---|---|
| 6,654,735 B1 | 11/2003 | Eichstaedt et al. | |
| 7,082,313 B2 | 7/2006 | Sabo et al. | |
| 7,508,321 B2 | 3/2009 | Gueziec et al. | |

(Continued)

FOREIGN PATENT DOCUMENTS

| | | |
|---|---|---|
| GB | 2452625 A | 3/2009 |
| GB | 2453810 A | 4/2009 |

(Continued)

OTHER PUBLICATIONS

Gebhard, H. and Lindner, L., Virtual Internet Broadcasting, Communications Magazine, IEEE, Jun. 2001 (Current Version published Aug. 7, 2002), pp. 182-188, vol. 39, Issue 6, Dortmund University, Germany.

(Continued)

*Primary Examiner* — Patrice Winder
*Assistant Examiner* — Julian Chang
(74) *Attorney, Agent, or Firm* — Eric Ho

(57) ABSTRACT

Methods and apparatuses are provided that may be implemented in various electronic devices to identify at least one current interest topic associated with message content transmitted over a wireless communication network, and affect programming of at least a portion of content for transmission over a multicast network based, at least in part, on the current interest topic.

46 Claims, 3 Drawing Sheets

500

Obtain At Least One Current Interest Topic Associated With Message Content From Electronic Messages Transmitted Via A Wireless Communication Network

↓ 502

Affect Programming Of At Least A Portion Of Content For Transmission Over A Multicast Network Based, At Least In Part, On The At Least One Current Interest Topic

504

(56) References Cited

U.S. PATENT DOCUMENTS

| | | | |
|---|---|---|---|
| 7,516,196 B1 | 4/2009 | Madan et al. | |
| 8,270,684 B2* | 9/2012 | Kiyohara et al. | 382/118 |
| 2002/0053078 A1* | 5/2002 | Holtz et al. | 725/14 |
| 2002/0078441 A1* | 6/2002 | Drake et al. | 725/9 |
| 2002/0108117 A1* | 8/2002 | Sedlak et al. | 725/87 |
| 2002/0193066 A1* | 12/2002 | Connelly | 455/2.01 |
| 2002/0194585 A1* | 12/2002 | Connelly | 725/9 |
| 2002/0194598 A1* | 12/2002 | Connelly | 725/39 |
| 2003/0135464 A1* | 7/2003 | Mourad et al. | 705/50 |
| 2006/0053077 A1* | 3/2006 | Mourad et al. | 705/51 |
| 2006/0177200 A1* | 8/2006 | Deutmeyer et al. | 386/98 |
| 2006/0184977 A1* | 8/2006 | Mueller et al. | 725/86 |
| 2006/0259469 A1 | 11/2006 | Chiu | |
| 2007/0124432 A1* | 5/2007 | Holtzman et al. | 709/219 |
| 2007/0186243 A1 | 8/2007 | Pettit et al. | |
| 2007/0226355 A1* | 9/2007 | Luckhardt | 709/227 |
| 2007/0288978 A1 | 12/2007 | Pizzurro et al. | |
| 2007/0294740 A1* | 12/2007 | Drake et al. | 725/131 |
| 2008/0005761 A1* | 1/2008 | Repasi et al. | 725/13 |
| 2008/0120501 A1 | 5/2008 | Jannink et al. | |
| 2008/0155582 A1* | 6/2008 | Sokola et al. | 725/14 |
| 2008/0155587 A1* | 6/2008 | Sokola et al. | 725/34 |
| 2008/0249833 A1 | 10/2008 | Ali et al. | |
| 2009/0011781 A1 | 1/2009 | Merrill et al. | |
| 2009/0044235 A1* | 2/2009 | Davidson | 725/87 |
| 2009/0087161 A1* | 4/2009 | Roberts et al. | 386/66 |
| 2009/0150925 A1* | 6/2009 | Henderson | 725/34 |
| 2009/0210904 A1 | 8/2009 | Baron et al. | |
| 2009/0248656 A1* | 10/2009 | Blinnikka | 707/5 |
| 2009/0254934 A1* | 10/2009 | Grammens | 725/14 |
| 2010/0064306 A1* | 3/2010 | Tiongson et al. | 725/24 |
| 2010/0125864 A1* | 5/2010 | Dwyer et al. | 725/24 |
| 2010/0145805 A1 | 6/2010 | Ma et al. | |
| 2010/0241498 A1* | 9/2010 | Chung et al. | 705/14.5 |
| 2011/0099288 A1* | 4/2011 | Sedlak et al. | 709/233 |
| 2011/0196874 A1* | 8/2011 | Ittiachen | 707/747 |
| 2011/0207482 A1* | 8/2011 | Shamma et al. | 455/466 |
| 2011/0219419 A1* | 9/2011 | Reisman | 725/112 |
| 2011/0225200 A1* | 9/2011 | Danis et al. | 707/783 |
| 2011/0314144 A1* | 12/2011 | Goodman | 709/224 |
| 2011/0320715 A1* | 12/2011 | Ickman et al. | 711/118 |
| 2012/0016948 A1* | 1/2012 | Sinha | 709/207 |
| 2012/0027256 A1* | 2/2012 | Kiyohara et al. | 382/103 |
| 2012/0040604 A1 | 2/2012 | Amidon et al. | |
| 2012/0042022 A1* | 2/2012 | Sheth et al. | 709/206 |
| 2012/0231761 A1* | 9/2012 | Norhammar et al. | 455/405 |
| 2012/0314917 A1* | 12/2012 | Kiyohara et al. | 382/118 |

FOREIGN PATENT DOCUMENTS

| | | |
|---|---|---|
| JP | 2006314072 A | 11/2006 |
| JP | 2010134936 A | 6/2010 |
| WO | WO2007146111 A2 | 12/2007 |
| WO | 2009087550 A2 | 7/2009 |
| WO | 2010102012 A2 | 9/2010 |

OTHER PUBLICATIONS

Istanbul Earthquake Rapid Response and Early Warning System, Journal Bulletin of Earthquake Engineering, Jan. 2003, pp. 157-163, vol. 1, No. 1, Springer Publishing, Netherlands.

FLO Technology Overview—Revolutionizing Multimedia, Qualcomm Incorporated, 2010, pp. 1-24, www.mediaflow.com, San Diego, CA, USA.

Enabling the Convergence of Media and Mobile—The MediaFLO System Overview Brochure, Qualcomm Incorporated, 2010, pp. 1-12, www.mediaflow.com, San Diego, CA, USA.

Quick Facts—MediaFLO Technologies, The MediaFLO System, Qualcomm Incorporated, 2010, pp. 1-2, www.mediaflow.com, San Diego, CA, USA.

Asur S, et al., "Predicting the Future with Social Media", Web Intelligence and Intelligent Agent Technology (WI-IAT), 2010 IEEE/WIC/ACM International Conference on, IEEE, Piscataway, NJ, USA, Aug. 31, 2010, pp. 492-499, XP031786158, ISBN: 978-1-4244-8482-9.

International Search Report and Written Opinion—PCT/US2011/056102—ISA/EPO—Jan. 12, 2012.

"Design and Effects of the Community Analysis Function in the Public Opinion Channel", Transactions of the Institute of Electronics, Information and Communication Engineers (IEICE), Japan, IEICE, Nov. 1, 2003, vol. J86-D-I, No. 11, pp. 838-847.

* cited by examiner

METHODS AND APPARATUSES FOR AFFECTING PROGRAMMING OF CONTENT FOR TRANSMISSION OVER A MULTICAST NETWORK

BACKGROUND

1. Field

The subject matter disclosed herein relates to electronic devices, and more particularly to methods and apparatuses for use in and/or with one or more electronic devices of a multicast network and/or wireless communication network.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

A mobile station represents various types of portable electronic devices that may send and/or receive information over one or more wireless communication networks. One popular mobile station is a cellular telephone or other like smart phone. Here, for example, with such a mobile station a user may communicate via voice or electronic messages. The message content that is transmitted may include, for example, text, images, video, etc. Such communication techniques tend to allow users to exchange information relatively quickly. For example, some users have been known to share news or other related content information as it happens through SMS messages, captured images, video, etc.

Some communication networks may be enabled to broadcast content to a plurality of subscriber units. For example, a multicast network may transmit various types of content over wired/fiber and/or wireless communication links. For example, such multicast content may include various forms of entertainment, news, and/or advertisement content that may be selected and played or otherwise presented using a subscriber unit. Here, for example, a subscriber unit may include a computing device such as a personal computer which may be coupled to a multicast network, (e.g., via the Internet). In other examples, a subscriber unit may include a mobile station such as a smart phone which may be coupled to a wireless multicast network (e.g., via one or more wireless multicast channels).

SUMMARY

In accordance with certain aspects, techniques are provided herein which may be implemented through various methods and apparatuses to identify at least one current interest topic associated with message content transmitted over a wireless communication network, and affect programming of at least a portion of content for transmission over a multicast network based, at least in part, on the current interest topic.

By way of example, a method may be implemented which includes obtaining one or more electronic signals representing at least one current interest topic associated with message content transmitted over a wireless communication network, and affecting programming of at least a portion of content for transmission over a multicast network based, at least in part, on the at least one current interest topic.

In certain example implementations, at least one current interest topic may be based, at least in part, on message content transmitted over the wireless communication network during a recent threshold period of time.

In certain example implementations, a method may also include obtaining the one or more electronic signals representing the at least one current interest topic from the wireless communication network, and/or obtaining the message content transmitted over the wireless communication network and determining the at least one current interest topic based, at least in part, on the message content. In certain example implementations, message content may comprise one or more electronic signals representing at least one of text information, image information, video information, audio information, metadata information, location information, profile information, and/or time information. In certain example implementations, message content may comprise SMS message content. In certain example implementations, a multicast network may comprise a wireless multicast network.

In certain other example implementations, a method may be implemented which includes obtaining one or more electronic signals representing message content transmitted over a wireless communication network, determining at least one current interest topic based, at least in part, on the message content, and transmitting one or more electronic signals representing the at least one current interest topic to a multicast network.

In certain other example implementations, an apparatus may be implemented which includes at least one transmitter to transmit content to a plurality of multicast network subscriber units, and at least one processing unit coupled to memory and the at least one transmitter to obtain at least one current interest topic associated with message content transmitted over a wireless communication network, and affect programming of at least a portion of the content for transmission to the plurality of multicast network subscriber units based, at least in part, on at least one current interest topic.

In still other example implementations, an apparatus may be implemented which includes memory to store message content transmitted over a wireless communication network, a network interface, and at least one processing unit coupled to the memory and the network interface to determine at least one current interest topic based, at least in part, on the message content and initiate transmission of the at least one current interest topic to a multicast network via the network interface.

In certain other example implementations, an article of manufacture may be implemented which includes a computer readable medium having computer implementable instructions stored thereon that in response to being executed by one or more processing units in an electronic device enable the electronic device to obtain one or more electronic signals representing at least one current interest topic associated with message content transmitted over a wireless communication network, and affect programming of at least a portion of content for transmission over a multicast network based, at least in part, on the at least one current interest topic.

In still other example implementations, an article of manufacture may be implemented which includes a computer readable medium having computer implementable instructions stored thereon that in response to being executed by one or more processing units in an electronic device enable the electronic device to obtain message content transmitted over a communication network, determine at least one current interest topic based, at least in part, on the message content, and initiate transmission of the at least one current interest topic to a multicast network.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
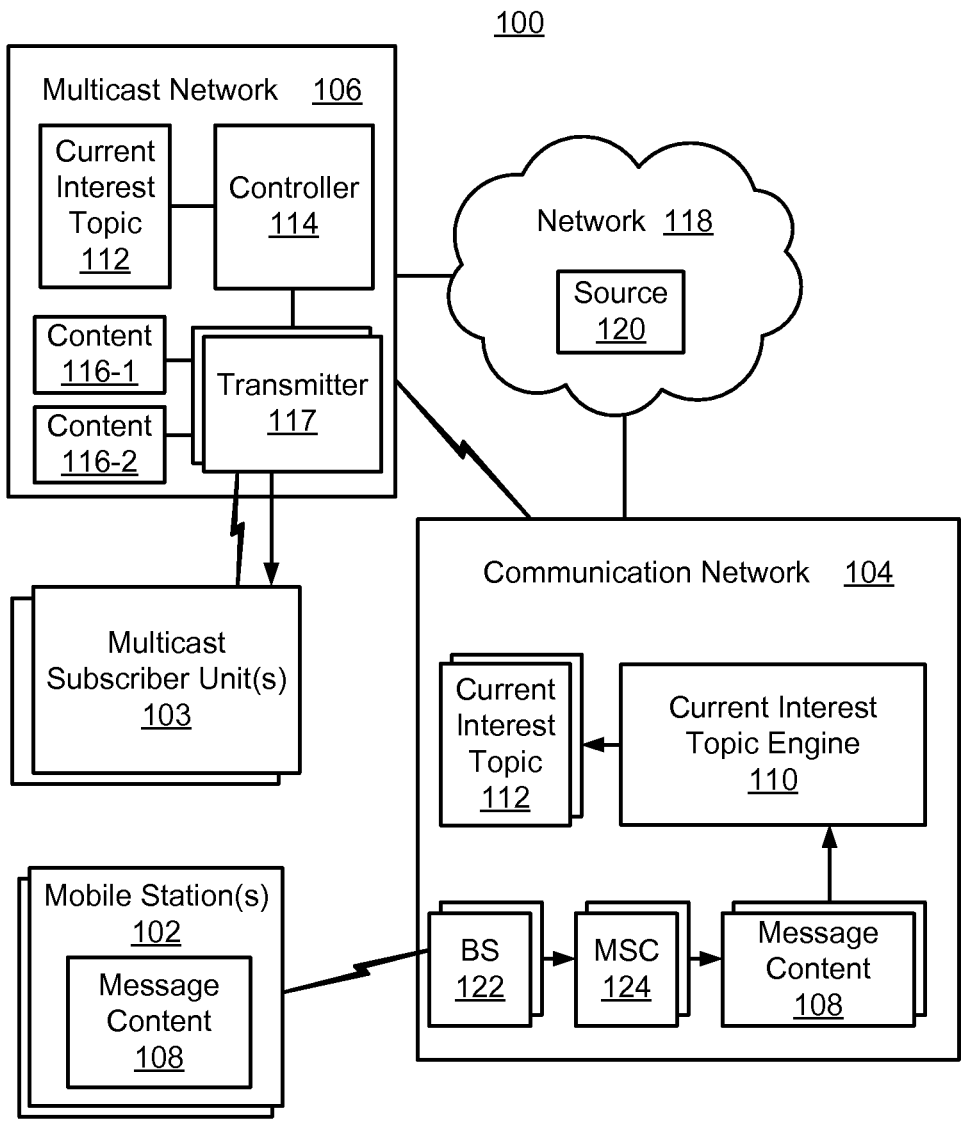
FIG. 1 is a schematic block diagram illustrating an exemplary environment that includes a multicast network and a wireless communication network, in accordance with an implementation.

Broadcasters of content typically desire to alter or change selections of available broadcast content in response to changes in audience interests, demographics, etc. Traditional methods of changing or altering programming of broadcast content have relied on using off-line information such as surveys, focus groups, audience rating systems including, for example, the Nielsen ratings. These techniques typically involve gathering data regarding viewership, analysis of the gathered data to draw inferences regarding audience tastes and making changes to programming based on the changing interests.

While such traditional methods of altering or changing broadcast content have been effective in tracking trends or changes over periods of weeks or months, such techniques are not effective at responding to current events and/or other quickly changing/developing interests.

In accordance with certain aspects, techniques are described herein which may be implemented in one or more electronic devices to allow a broadcaster of content to more effectively respond to current events and/or other quickly changing or newly developing interests of an audience. To do this, techniques are provided which allow for one or more "current interest topics" to be determined based on electronic message content that is transmitted over a wireless communication network. This message content may be gathered and data-mined or otherwise processed and analyzed quickly by one or more computing devices to identify one or more current events and/or other subject matter that would appear to be of some interest to at least the users sharing such information over the wireless communication network. Having quickly identified one or more current interest topics, techniques may then be implemented to affect programming of at least a portion of content that is broadcast. In certain examples, content for transmission over a multicast network may be quickly affected in some manner based, at least in part, on one or more identified current interest topics.

Thus, if at least a portion of an audience (e.g., subscribers) of the multicast network has similar interests as some of the users of the wireless communication network, then such techniques may provide for a quick programming response to the changing or developing interests of many of the subscribers. Indeed, in certain example implementations, a user of the wireless communication network may also be a subscriber of the multicast network. Moreover, in certain non-limiting examples, a single electronic device (e.g., a smart phone) may interface with both the wireless communication system and the multicast network.

By way of non-limiting example, certain implementations may be directed to using a multicast network to transmit content to subscribers and affecting programming of at least a portion of content for transmission based, at least in part, on detection of some real-time condition or event. In a particular implementation, such a multicast network may comprise a cellular wireless multicast network such as wireless communication networks employing MediaFLO™ technology and/or the like. In other example implementations, a multicast network may be coupled to, but operate separate from, a wireless communication network.

In other example implementations, a multicast network may comprise a wired communication network (e.g., the Internet) over which content is broadcast to subscribers. Here, for example, a subscriber unit may comprise a personal computing device, set-top box computing device, and/or the like.

Reference is now made to FIG. 1, which is a schematic block diagram illustrating an exemplary environment 100 that includes a plurality of mobile stations 102 coupled to a wireless communication network 104, and a plurality of multicast subscriber units 103 coupled to a multicast network 106, in accordance with an implementation.

As shown in this example, wireless communication network 104 may also be coupled to multicast network 106, for example through a network 118 or directly (e.g., via a wired and/or a wireless link). Network 118 may, for example, include the Internet and/or other like communication capability/service.

Mobile stations 102 are representative of any electronic device that may send and/or receive information represented by one or more electronic signals within environment 100. By way of example but not limitation, mobile device 102 may include a cellular telephone or other like portable communication/computing device. As illustrated in FIG. 1, mobile station 102 may be enabled to receive and/or otherwise establish message content 108. Message content 108 may, for example, comprise content that may be transmitted to communication network 104 in or as part of one or more electronic messages. By way of a non-limiting example, message content 108 may comprise or otherwise relate to text, image, video, and/or audio content.

Communication network 104 may include a plurality of resources (e.g., computer/communication devices, etc.) of which one or more resources may be enabled to function at least in part as a current interest topic engine 110. Current interest topic engine 110 may be enabled to identify or otherwise establish one or more current interest topics 112.

By way of non-limiting example, current interest topic engine 110 may identify at least one current interest topic 112 based, at least in part, on message content 108 as received from one or more mobile stations through a Base Station (BS)

122 and gathered and/or otherwise made available by a Mobile Switching Center (MSC) 124.

By way of non-limiting examples, current interest topic engine 110 may identify at least one current interest topic 112 based, at least in part, on message content 108 that is made "accessible" based on or subject to certain security/privacy agreements between a service provider and a user.

Current interest topic engine 110 may include, for example, an expert system and/or the like which may process message content 108 to identify common subject matter, etc., which may indicate and/or otherwise relate in some manner to a potential trend in a current interest topic. Thus, for example, current interest topic engine 110 may consider text information, image information, video information, audio information, metadata information, location information, user profile information, time information, and/or the like or various combinations thereof. In certain implementations, message content may include SMS-based message content.

Communication network 104 may, for example, provide one or more current interest topics 112 to multicast network 106. Here, for example, as illustrated multicast network 106 may be coupled to communication network 104 through a wireless communication link and/or via a network 118. It should be kept in mind, that while illustrated in this example as being separate networks, in certain implementations communication network 104 and multicast network 106 may be combined in whole or part.

Multicast network 106 may, for example, comprise a controller 114 that may be responsive to one or more current interest topics 112. Controller 114 may affect programming of at least a portion of content for transmission based, at least in part, on one or more current interest topics 112. Thus, as shown in this example, one or more multicast transmitters 117 may be selectively enabled to broadcast content 116 to a plurality of subscriber units 103. Here, controller 114 may affect such transmission in response to a current interest topic. For example, controller 114 may directly or indirectly instruct a multicast transmitter to halt transmission of content 116-1. For example, controller 114 may directly or indirectly instruct a multicast transmitter to start transmission of content 116-2. For example, controller 114 may directly or indirectly instruct a multicast transmitter to start transmission of a combination of content 116-1 and content 116-2.

Content 116 may be any applicable content that a multicast subscriber unit 103 may be enabled to receive and process in some manner. While illustrated here as being within multicast network 106, it should be clear that content 116 may reside in one or more resources that are operatively coupled to multicast network 106. For example, all or a portion of content 116 may be stored on and/or otherwise available from a content source 120 (e.g., a database, a server, another network, the Internet, etc.) shown here as being operatively coupled to network 118.

Mobile station 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Figure 2:
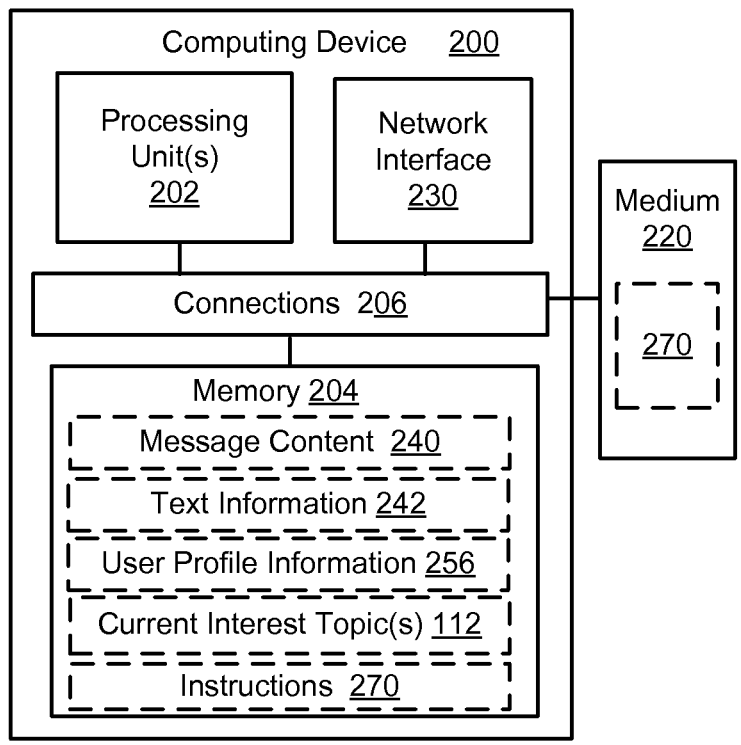
FIG. 2 is a schematic block diagram illustrating certain features of an electronic device in the form of a computing device that may determine at least one current interest topic based, at least in part, on message content transmitted over a wireless communication system, in accordance with an implementation.

Reference is made next to FIG. 2 which is a schematic block diagram showing certain features of an electronic device in the form of a computing device 200 that may determine at least one current interest topic based, at least in part, on message content transmitted over a wireless communication system, in accordance with an implementation. For example, computing device 200 may be enabled to provide all or part of the data processing relating to current interest topic engine 110 (FIG. 1).

As illustrated in the exemplary schematic block diagram of FIG. 2, in certain example implementations, device 200 may include one or more processing units 202, memory 204, connections 206, medium 220, and/or network interface 230.

As illustrated, memory 204 may store message content such as, for example, text information, image information, video information, audio information, time information, metadata information, location information, user profile information, and/or any combination thereof or the like as may be generated by and/or otherwise established by one or more mobile stations 102, and/or possibly BS 122, MSC 124, and/or other resources within wireless communication network 104 (FIG. 1).

Text information 242 may, for example, be manually input using a mobile station via a keypad and/or other like user input mechanism, or input via speech recognition processes based on audio information from a microphone. Image information and/or video information may, for example, be generated by camera of a mobile station. Audio information may, for example, be generated by a microphone of a mobile station. Time information may, for example, be established by mobile station 102, and/or possibly BS 122, MSC 124, and/or other resources within wireless communication network and may relate in some manner to all or portions of message content. For example, time information may comprise a timestamp or other like information indicating a message transmission/reception time, an image/video/audio capture time, etc.

Metadata information may, for example, be established by a mobile station 102, and/or possibly BS 122, MSC 124, and/or other resources within wireless communication network and may relate in some manner to all or portions of message content 108. For example, metadata information may comprise additional information regarding the mobile station or portions thereof. For example, metadata information may comprise additional information regarding captured image/video/audio information (e.g., geographical location and/or other like geo-tagging information).

Location information may, for example, be established by a mobile station, with or without external assistance. Location information may, for example, include and/or otherwise identify a measured or estimated relative position, a geographical coordinate, a wireless network cell or region, etc.

User profile information may, for example, be provided by a mobile station 102, and/or possibly BS 122, MSC 124, and/or other resources within wireless communication network. User profile information may, for example, include and/or otherwise identify certain user related information that may be considered along with other information described herein by current interest topic engine 110 (FIG. 1). For example, user profile information 256 may identify various user preferences, subscriptions, groups, memberships, interests/disinterests, demographic information, mobile station device information, etc.

Memory 204 may have stored therein various other data and computer implementable instructions 270. Such instructions may be executed, for example, by one or more processing units or processors 202.

As illustrated in FIG. 2 an article of manufacture represented here by a computer readable medium 220 may be provided and accessed by processing unit(s) 202, for example. As such, in certain example implementations, the methods and/or apparatuses may take the form in whole or part of a computer readable medium 220 that includes computer implementable instructions 270 stored thereon, which if executed by at least one processing unit or other like circuitry enable the processing unit(s) 202 and/or the other like circuitry to perform all or portions of the techniques/processes as presented in the examples herein. Computer readable medium 220 may be representative of any data storage mechanism.

Processing unit(s) 202 may be implemented in hardware or a combination of hardware and software. Processing unit(s) may be representative of one or more circuits configurable to perform at least a portion of a data computing procedure or process. By way of example but not limitation, processing unit(s) may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202, it should be understood that at least a portion of a primary memory may be provided within or otherwise co-located/coupled with the processing unit(s). Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium.

As further illustrated in FIG. 2, device 200 may include one or more connections 206 (e.g., buses, lines, conductors, fibers, etc.) to operatively couple the various circuits together.

Network interface 230 may include applicable circuitry and/or other like functionality to operatively couple device 200 to one or more networks and/or one or more other devices via one or more wired/fiber and/or wireless communication links.

Figure 3:
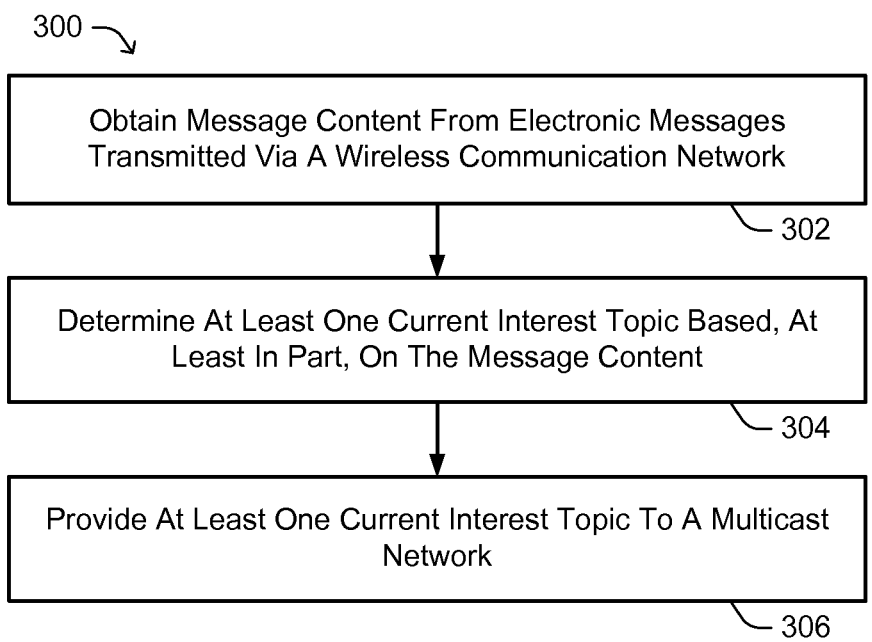
FIG. 3 is a flow diagram illustrating an example process that may be implemented in one or more electronic devices, to determine at least one current interest topic based, at least in part, on message content transmitted over a wireless communication system, in accordance with an implementation.

Reference is made next to FIG. 3, which is a flow diagram illustrating an example process 300 that may be implemented in one or more electronic devices, to determine at least one current interest topic based, at least in part, on message content from one or more electronic messages transmitted over a wireless communication system, in accordance with an implementation. Process 300 may be implemented at least on part, for example, in computing device 200 (FIG. 2).

At block 302, message content may be obtained from one or more electronic messages transmitted over at least one wireless communication network. By way of a non-limiting example, message content may be obtained from SMS messages processed through a MSC and/or the like. For example, an MSC may copy or otherwise capture message content as such messages are communicated using the wireless communication network. Here, for example, such message content may be immediately provided for additional processing (e.g., data mining) and/or stored for a period of time and provided for additional processing along with other message content (e.g., in a batch mode).

At block 304, at least one current interest topic may be determined based, at least in part, on the message content obtained at block 302. At block 304, data mining and/or other like processes may be performed, e.g., depending on the type(s) of message content available, to identify a current interest topic. In certain example implementations, an expert system and/or other like intelligent agent may be used and/or trained to examine message content and identify certain common or concurrent trends or themes which may relate to a potential current interest topic. In certain implementations, at block 304, some additional processing may be employed to transform or otherwise handle certain types of message content. Here, for example, semantic or other like linguistic processes may be performed to translate or otherwise modify in some manner the original text, and/or derive subject matter or other like information from such original and/or further processed text. In certain examples, image recognition or other like visual processes may be performed to translate or otherwise modify in some manner image and/or video content, and/or derive subject matter or other like information from such original and/or further processed image and/or video content. Similarly, in certain examples, speech recognition or other like processes may be performed to translate or otherwise modify in some manner audio content, and/or derive subject matter or other like information from such original and/or further processed audio content.

In certain implementations, at block 304, a current interest topic may be based, at least in part, on message content that has been transmitted over the wireless communication network during a recent threshold period of time. By way of non-limiting example, it may be useful to focus the determination process at block 304 on a current interest topic on a relatively short threshold period of time, such as, the last minute, hour, day, etc. In certain implementations, a threshold period of time may define a "real-time" period. In certain examples, it may be useful to focus the determination process at block 304 on a current interest topic on a specific period of time, such as, between 5-8 PM, a specific day/date, a holiday, etc.

In certain example implementations, given applicable location information it may be useful to focus the determination process at block 304 on a current interest topic on a specific location or region, such as, a city, a parish, a campus, a state, etc.

At block 306, one or more current interest topics may be provided (as needed) to a multicast network, for example. In certain example implementations, at block 306, one or more current interest topics may be transmitted over wired/fiber and/or wireless communication networks to one or more controllers in one or more multicast networks.

Figure 4:
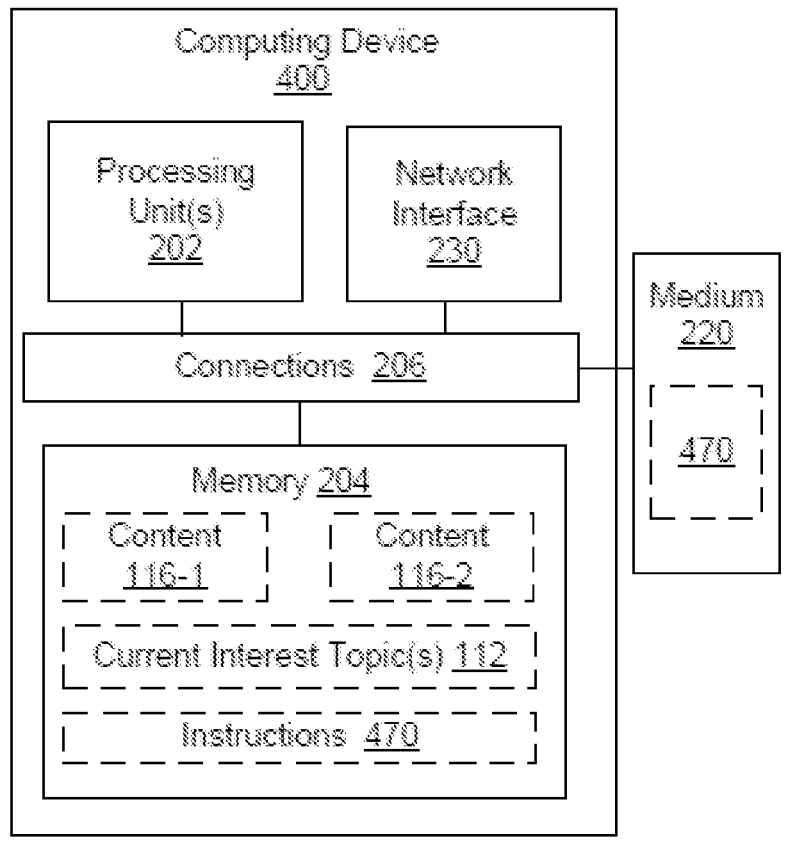
FIG. 4 is a schematic block diagram illustrating certain features of an electronic device in the form of a computing device that may affect programming of at least a portion of content for transmission over a multicast network based, at least in part, on at least one current interest topic, in accordance with an implementation.

Reference is made next to FIG. 4 which is a schematic block diagram showing certain features of an electronic device in the form of a computing device 400 that may affect programming of at least a portion of content for transmission over a multicast network based, at least in part, on at least one current interest topic, in accordance with an implementation. For example, computing device 400 may be enabled to provide all or part of the data processing relating to controller 114 (FIG. 1).

As illustrated in the exemplary schematic block diagram of FIG. 4, in certain example implementations, device 400 may include one or more processing units 202, memory 204, connections 206, medium 220, and/or network interface 230. Memory 204 may store one or more current interest topics 112, and possibly at least a portion of content to be broadcast (shown here as content 116-1 and 116-2). Memory 204 may have stored therein various other data and computer implementable instructions 470. Such instructions may be executed, for example, by one or more processing units or processors 202 to perform all or part of process 500 (FIG. 5).

As illustrated in FIG. 4 an article of manufacture represented here by a computer readable medium 220 may be provided and accessed by processing unit(s) 202, for example. As such, in certain example implementations, the methods and/or apparatuses may take the form in whole or part of a computer readable medium 220 that includes computer implementable instructions 270 stored thereon, which if executed by at least one processing unit or other like circuitry enable the processing unit(s) 202 and/or the other like circuitry to perform all or portions of the techniques/processes as presented in the examples herein. Computer readable medium 220 may be representative of any data storage mechanism.

Figure 5:
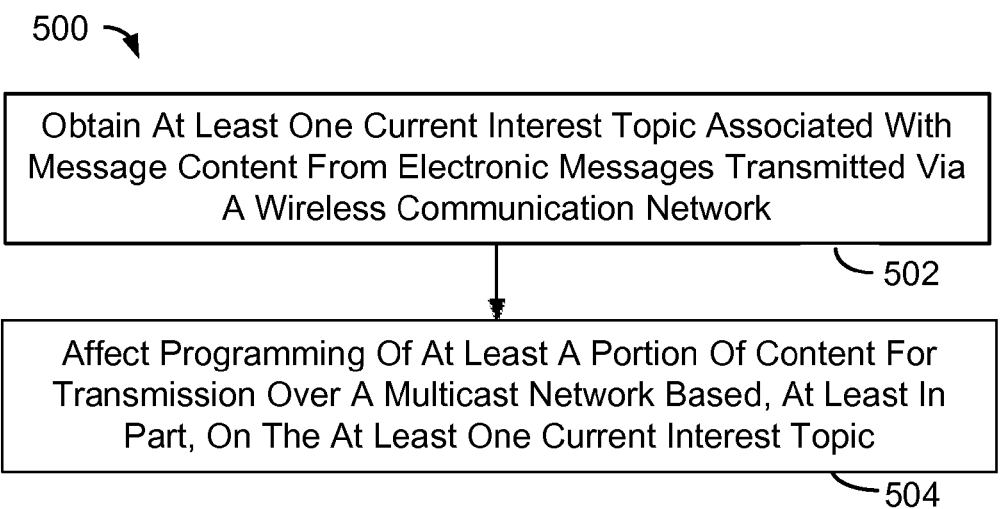
FIG. 5 is a flow diagram illustrating an example process that may be implemented in one or more electronic devices, to affect programming of at least a portion of content for transmission over a multicast network based, at least in part, on at least one current interest topic, in accordance with an implementation.

Reference is made next to FIG. 5, which is a flow diagram illustrating an example process 500 that may be implemented in one or more electronic devices, to affect programming of at least a portion of content for transmission over a multicast network based, at least in part, on at least one current interest topic, in accordance with an implementation. Process 500 may be implemented at least in part, for example, in computing device 400 (FIG. 4). It is also recognized that in certain implementations, all or part of processes 300 (FIG. 3) and 500 may be implemented in a common computing device 200 (FIG. 2) or 400 (FIG. 4).

At block 502, at least one current interest topic may be obtained. Here, for example, a current interest topic may be received or otherwise provided over a communication link. For example, see block 306 (FIG. 3).

At block 504, programming of at least a portion of content for transmission over a multicast network may be affected in some manner based, at least in part, on at least one current interest topic. Here, for example, content that is being broadcast may be interrupted, replaced, and/or otherwise modified in some manner in response to one or more current interest topics.

By way of further example, at block 504, a current interest topic may indicate that an event of some type has been the subject of recent electronic messages transmitted over one or more wireless communication systems. Accordingly, programming of at least a portion of content for transmission over a multicast network may be affected in some manner appropriate for such event. Thus, for example, content may be added or changed which relates in some manner to the event. One potential benefit is that such change in broadcast content may occur in "real-time" as an event happens and/or information about the event starts to spread to those that may be interested.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   intercepting a short message service (SMS) message generated by a mobile station, wherein the SMS message includes information associated with a first current interest topic; and
   in response to intercepting the SMS message:
      discontinuing transmission of first content over a multicast network; and initiating transmission of second content over the multicast network, wherein the second content is associated with the first current interest topic.

2. The method of claim 1, further comprising intercepting audio content generated by the mobile station, wherein the audio content includes information associated with a second current interest topic.

3. The method of claim 2, further comprising initiating transmission of third content over the multicast network in response to intercepting the audio content, wherein the third content is associated with the second current interest topic.

4. The method of claim 3, wherein the second content and the third content are transmitted simultaneously over the multicast network.

5. The method of claim 1, wherein the mobile station transmits the SMS message using a wireless communication network.

6. The method of claim 5, wherein the wireless communication network includes a time division multiple access network.

7. The method of claim 5, wherein the wireless communication network includes a frequency division multiple access network.

8. The method of claim 1, wherein the SMS message is generated at the mobile station in response to user input via a user input device.

9. A method comprising:
   intercepting a short message service (SMS) message generated by a mobile station;
   determining a first current interest topic based on content of the SMS message; and
   transmitting an indication of the first current interest topic to a multicast network to enable the multicast network to:
      discontinue transmission of first content; and
      transmit second content, wherein the second content is associated with the first current interest topic.

10. The method of claim 9, further comprising:
    intercepting audio content generated by the mobile station; and
    determining a second current interest topic based on the audio content.

11. The method of claim 10, further comprising transmitting an indication of the second current interest topic to the multicast network to enable the multicast network to transmit third content, wherein the third content is associated with the second current interest topic.

12. The method of claim 11, wherein the second content and the third content are transmitted simultaneously over the multicast network.

13. The method of claim 9, wherein the mobile station transmits the SMS message using a wireless communication network.

14. The method of claim 9, wherein the first current interest topic is determined in response to a number of SMS messages that are intercepted during a one minute time period and that include information associated with the first current interest topic satisfying a threshold.

15. The method of claim 9, wherein the first current interest topic is determined in response to a number of SMS messages that are intercepted during a three hour time period and that include information associated with the first current interest topic satisfying a threshold.

16. An apparatus comprising:
    means for transmitting content via a multicast network;
    means for intercepting a short message service (SMS) message generated by a mobile station, wherein the SMS message includes information associated with a first current interest topic;
    means for discontinuing transmission of first content over the multicast network in response to intercepting the SMS message; and
    means for initiating transmission of second content over the multicast network in response to intercepting the SMS message, wherein the second content is associated with the first current interest topic.

17. The apparatus of claim 16, wherein the means for discontinuing transmission and the means for initiating transmission comprises a processor.

18. The apparatus of claim 16, further comprising:
    means for intercepting audio content generated by the mobile station, wherein the audio content includes information associated with a second current interest topic; and
    means for initiating transmission of third content over the multicast network in response to intercepting the audio content, wherein the third content is associated with the second current interest topic.

19. The apparatus of claim 18, wherein the second content and the third content are transmitted simultaneously over the multicast network.

20. An apparatus comprising:
means for intercepting a short message service (SMS) message generated by a mobile station;
means for determining a first current interest topic based on content of the SMS message; and
means for transmitting an indication of the first current interest topic to a multicast network to enable the multicast network to:
discontinue transmission of first content; and
transmit second content, wherein the second content is associated with the first current interest topic.

21. The apparatus of claim 20, wherein the means for determining comprises a processor.

22. The apparatus of claim 20, further comprising:
means for intercepting audio content generated by the mobile station; and
means for determining a second current interest topic based on the audio content.

23. An apparatus comprising:
at least one transmitter to transmit first content to a plurality of multicast network subscriber units; and
at least one processing unit coupled to the at least one transmitter, the at least one processing unit configured to:
intercept a short message service (SMS) message generated by a mobile station, wherein the SMS message includes information associated with a first current interest topic;
discontinue transmission of the first content in response to intercepting the SMS message; and
initiate transmission of second content to the plurality of multicast network subscriber units in response to intercepting the SMS message, wherein the second content is associated with the first current interest topic.

24. The apparatus of claim 23, wherein the at least one transmitter is configured to transmit the first content prior to the at least one processing unit intercepting the SMS message.

25. The apparatus of claim 23, wherein the at least one processing unit is further configured to intercept audio content generated by the mobile station, wherein the audio content includes information associated with a second current interest topic.

26. The apparatus of claim 25, wherein the at least one processing unit is further configured to initiate transmission of third content to the plurality of multicast network subscriber units in response to intercepting the audio content, wherein the third content is associated with the second current interest topic.

27. The apparatus of claim 26, wherein the second content and the third content are transmitted simultaneously to the plurality of multicast network subscriber units.

28. The apparatus of claim 23, wherein the at least one transmitter comprises a wireless transmitter.

29. An apparatus comprising:
memory to store one or more messages transmitted via a wireless communication network;
a network interface; and
at least one processing unit coupled to the memory and the network interface, the at least one processing unit configured to:
intercept a short message service (SMS) message generated by a mobile station;
determine a first current interest topic based on content of the SMS message;
discontinue transmission of first content; and
initiate transmission of second content to a multicast network via the network interface, wherein the second content is associated with the first current interest topic.

30. The apparatus of claim 29, wherein the at least one processing unit is further configured to intercept audio content generated by the mobile station, wherein the audio content includes information associated with a second current interest topic.

31. The apparatus of claim 30, wherein the at least one processing unit is further configured to initiate transmission of third content to the multicast network via the network interface in response to intercepting the audio content, wherein the third content is associated with the second current interest topic.

32. An article comprising:
a non-transitory computer readable medium having computer implementable instructions stored therein that, when executed by a processing unit, cause the processing unit to:
intercept a short message service (SMS) message generated by a mobile station, wherein the SMS message includes information associated with a first current interest topic; and
in response to intercepting the SMS message:
discontinue transmission of first content over a multicast network; and
initiate transmission of second content over the multicast network, wherein the second content is associated with the first current interest topic.

33. The article of claim 32, wherein the computer implementable instructions are further executable by the processing unit to intercept audio content generated by the mobile station, wherein the audio content includes information associated with a second current interest topic.

34. The article of claim 33, wherein the computer implementable instructions are further executable by the processing unit to initiate transmission of third content over the multicast network in response to intercepting the audio content, wherein the third content is associated with the second current interest topic.

35. The article of claim 34, wherein the second content and the third content are transmitted simultaneously over the multicast network.

36. The article of claim 32, wherein the mobile station transmits the SMS message using a wireless communication network.

37. The article of claim 36, wherein the wireless communication network includes a time division multiple access network.

38. An article comprising:
a non-transitory computer readable medium having computer instructions stored therein that, when executed by a processing unit, cause the processing unit to:
intercept a short message service (SMS) message generated by a mobile station;
determine a first current interest topic based on content of the SMS message; and
transmit an indication of the first current interest topic to a multicast network to enable the multicast network to:
discontinue transmission of first content; and transmit second content, wherein the second content is associated with the first current interest topic.

39. The article of claim 38, wherein the computer instructions are further executable by the processing unit to:
intercept audio content generated by the mobile station; and
determine a second current interest topic based on the audio content.

40. The article of claim 39, wherein the computer instructions are further executable by the processing unit to transmit an indication of the second current interest topic to the multicast network to enable the multicast network to transmit third content, wherein the third content is associated with the second current interest topic.

41. The article of claim 40, wherein the second content and the third content are transmitted simultaneously.

42. The article of claim 38, wherein the mobile station transmits the SMS message using a wireless communication network.

43. The article of claim 42, wherein the wireless communication network includes a code division multiple access network.

44. The article of claim 42, wherein the wireless communication network includes a time division multiple access network or a frequency division multiple access network.

45. The article of claim 41, wherein the computer instructions are further executable by the processing unit to translate text included in the SMS message.

46. The article of claim 41, wherein the computer instructions are further executable by the processing unit to identify a common trend of the SMS message.

* * * * *